(12) United States Patent
Kol et al.

(10) Patent No.: US 7,802,194 B2
(45) Date of Patent: Sep. 21, 2010

(54) BUSINESS QUERY LANGUAGE

(75) Inventors: Nir Kol, Sunnyvale, CA (US); Frederic E. Samson, Palo Alto, CA (US)

(73) Assignee: SAP AG, Waldorf (DE)

( * ) Notice: Subject to any disclaimer, the term of this patent is extended or adjusted under 35 U.S.C. 154(b) by 667 days.

(21) Appl. No.: 11/759,841

(22) Filed: Jun. 7, 2007

(65) Prior Publication Data

US 2008/0189655 A1     Aug. 7, 2008

Related U.S. Application Data

(60) Provisional application No. 60/899,068, filed on Feb. 2, 2007.

(51) Int. Cl.
    *G06F 3/00*     (2006.01)
    *G06F 3/048*     (2006.01)

(52) U.S. Cl. .................. 715/765; 715/810; 715/808

(58) Field of Classification Search .......... 715/700, 715/705, 708, 733, 740, 741, 752, 764, 765, 715/808, 853, 200, 201, 205, 212, 215, 810
See application file for complete search history.

(56) References Cited

U.S. PATENT DOCUMENTS

| | | | |
|---|---|---|---|
| 6,349,295 B1 * | 2/2002 | Tedesco et al. | 707/3 |
| 7,363,295 B2 * | 4/2008 | Szeto et al. | 707/3 |
| 7,395,511 B1 * | 7/2008 | Robertson et al. | 715/810 |
| 7,441,197 B2 * | 10/2008 | Tschiegg et al. | 715/741 |
| 2006/0010118 A1 * | 1/2006 | Sattler et al. | 707/3 |
| 2006/0090142 A1 * | 4/2006 | Glasgow et al. | 715/780 |
| 2006/0101347 A1 * | 5/2006 | Runov et al. | 715/764 |
| 2006/0129541 A1 * | 6/2006 | Morgan et al. | 707/3 |

* cited by examiner

*Primary Examiner*—X. L Bautista
(74) *Attorney, Agent, or Firm*—Blakely Sokoloff Taylor & Zafman

(57) ABSTRACT

Methods and apparatuses enable providing a structured business query interface to receive a structured business query. The interface can be provided as an extension to a business productivity application. The query is made without having to change context from the application to another program, but rather can be made within the context of the application. The query triggers access to a backend, which may result in accessing a data object that is inserted or embedded into the application, or a document of the application. In one embodiment, a business process extension is also available to the application, which enables a task pane within the application with other features and/or data. In one embodiment, related data can be accessed in response to selecting the inserted data object, which can provide additional information on the data object without leaving the context of the application.

23 Claims, 18 Drawing Sheets

BUSINESS QUERY LANGUAGE

This U.S. Non-Provisional Application claims priority to U.S. Provisional Application No. 60/899,068 filed Feb. 2, 2007.

FIELD

Embodiments of the invention relate to query input, and more particularly to a query mechanism that provides access to an enterprise backend.

BACKGROUND

Employees or participants in an enterprise system perform most or all of their job functions through software applications executing on computing devices that access the enterprise system. As the business world has become increasingly complex, systems have been designed to separate different aspects of business, for example, by creating separate software systems for emailing, word processing, database access, etc. Especially as a company grows, separation of databases and knowledge base may also be separated by business role, such as human resources and customer relations, which may each have a separate database and business logic, each with separate software interfaces. Thus, an employee of a company may spend more and more time switching between business applications, for example, "pulling up" data in one interface, and copying it into another. This may be referred to as switching contexts between programs or user interfaces. The employee may find it necessary to sift through databases or knowledge stores to search for information to include in a particular report or email that is being produced in a particular business productivity application (e.g., applications from MICROSOFT OFFICE of MICROSOFT CORPORATION of Redmond, Wash., OPEN OFFICE available at www.openoffice.org by SUN MICROSYSTEMS, INC., of Santa Clara, Calif., etc.). All trademarks herein are used solely for purposes of identification; all trademarks used herein are the property of their respective owners. Note that the employee may know exactly what type of information or know that particular data exists, and yet still spend considerable effort finding where exactly on the enterprise system the data exists. Additionally, after finding the data, inclusion of the data into the business productivity application is not guaranteed, depending on the format in which the data exists and/or support by the business productivity application for the data.

Thus, despite the power of computing devices, and the general convenience of known user interfaces (UIs), especially graphical user interfaces (GUIs), and business productivity applications, an employee may spend time finding and including known, existing data that could be used more productively in other ways. Traditional interfacing to enterprise data via existing UIs involves multiple, unrelated desktop applications. The use of multiple independent applications has at least the defect of being time-consuming. Depending on the applications being used, the use of the multiple, independent applications can result in security risks or inconsistencies, and/or data access, retrieval, or use problems. The business productivity applications may be inadequately designed for enterprise access desired by participants in an enterprise system.

BRIEF DESCRIPTION OF THE DRAWINGS

The following description includes discussion of figures having illustrations given by way of example of implementations of embodiments of the invention. The drawings should be understood by way of example, and not by way of limitation.

DETAILED DESCRIPTION

Figure 1:
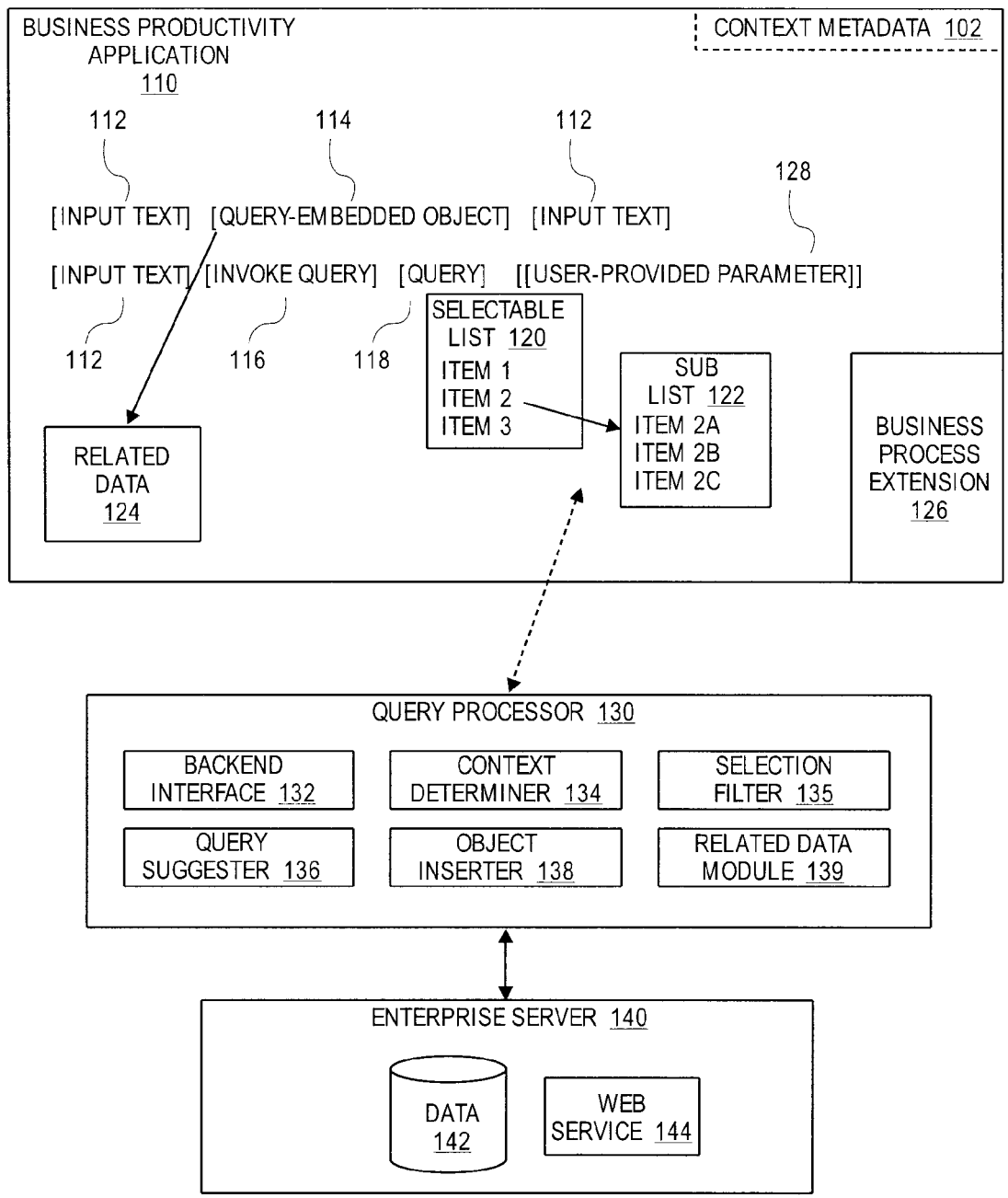
FIG. 1 is a block diagram of an embodiment of system in which a business query can access an enterprise backend.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

An extension for a business productivity application enables a business query to access and incorporate enterprise data into the business productivity application. An integrated, interpretive, editable scripting language can handle information queries directly from Microsoft Office or similar applications (all marks used herein are the property of their respective owners) and bring the requested data into a user's workspace for incorporation into the application. In one embodiment, the information query is provided through a guided experience. A predefined sequence of keys will initiate the query, for example, using IntelliSense (of Microsoft Corporation), or similar autocompletion technology. Once a query is invoked, the query exists in one of multiple states that can create a query through key presses and/or selection of suggested items. Thus, even if a user is not completely familiar with a data structure of a particular business application or database, the user is able to create a query that will obtain the relevant information from the application or database. In a guided query, business context of the user provides parameters to the query. Thus, a business role of the user, a security access of the user, a business area (e.g., a particular project), etc., may all provide context to the query engine, which provides suggestions according to the context. Additionally, the system may suggest and/or require other parameters.

In one embodiment, the business query accepts one of two states to complete a query. One state (referred to as a "first" state for purposes of description) is where the user has a specific piece of knowledge to have matched, such as a customer name or an employee number. The user can type the information to be matched directly into the interface, and it will be incorporated into the query. Another state (referred to as a "second" state for purposes of description) is where the query engine provides one or more lists of options, including embedded lists (e.g., a hierarchical tree structure of selectable items/options), from which a user selects. The lists of options can be predefined or configured to enable the query engine. The options can be related to a higher order of the clause, for example, Customer, Invoice, Date Range, Supplier, Contracts, Quotation, Pipeline, Product, etc. The user selects from the provided options to complete the query or receive more input options.

For example, in one embodiment, for either the first or second state in the query functions, the interface prompts the user to indicate what the information is used for and what is being asked, such as describing Pipeline as "All open and prospective deals," or displaying what data is expected to complete the input clause "Account Executive" by showing, "Accepts an Account Executive name as a parameter." The interface can provide relevant contextual descriptions of the function as well as the necessary parameters required. The description of a term may be an "enterprise definition" of a term or phrase that defines its use within the enterprise system, and may provide its standard parameters. In one embodiment, the query has defaults that are provided. Note that a user may not be completely familiar with the intended use of terms in the enterprise. That is, the user may not understand the meaning or definition a term has within the enterprise. Thus, providing a description of terms can assist the building of the query. The description of terms may be provided as a user moves a cursor down a list of possible terms, and/or with an auto-selection of the term such as through auto-complete in response to receiving a typed in query, where the term may be selected and the description would be provided. Other mechanisms for providing definitions may be used. Thus, on top of suggesting a query term, the system may provide an enterprise definition of the term.

In one embodiment, when one of the input states (first or second, as described above) is satisfied, the query may then exist in one of three states: 1) inputted data results in a completed query for the requested information; 2) more information is necessary to be obtained from another first state (e.g., a query that requires multiple "parameters"); 3) more information is necessary to be obtained from a second state. When the inputted data results in a completed query, the query engine executes on the query (described in more detail below). When more information is necessary from a first state, the query interface prompts a user to input more information. When more information is necessary from a second state, a user is prompted to select from a list, which may be an embedded list (e.g., selecting "Customer" from one list may prompt the user to select from among "Customer1," "Customer2," or "Customer3").

It will be understood that in contrast to what is traditionally known, the query input need not be received in a separate environment or a separate user interface (UI). The query itself can be built and executed from within the environment of the program in which the query is initiated. As used herein, executed refers to initiating the query method within business logic of the application itself, or within business logic of an extension of the application, or within business logic in a backend system coupled to the application via interfaces. Business logic refers to code and/or objects that provide functionality. Thus, instead of, for example, initiating a search in a program, and a popup window being brought up to accept an input outside the context of the program or outside the context of the work being performed within the program, as described herein, the query can be built in the body of the program. A separate UI is unnecessary. The query input space or area can be dynamically allocated directly within the UI of the host program. Context does not need to be changed through a separate window of a different program, and additional context does not need to be added by bringing up an additional window within the same program.

Once the query engine receives a completed query, the query engine accesses the enterprise backend. Data can be accessed, and pulled directly into the application from which the user invoked the query. Note that security or permissions can be verified in one or a combination of several ways: the user may be disallowed from making a query for data objects to which the user does not have access (applying security at the query); and/or in response to a successful query, the query engine can check the security requirements of the accessed data object(s) to verify that the user has access to it (applying security at the data access), or requesting authentication data (e.g., a password, etc.). In one embodiment, the system will use security permissions to ensure authorized data access is enabled by line of business application or database of record.

In one embodiment, the query is enhanced by a knowledge of the search space. That is, the search may typically be for a particular object within the enterprise (a data object, or business object), which is generally stored within a relational database. A relational database generally is structured with fields and/or tables, which can be used in the search. A more directed search may be possible than, for example, searches of web pages or plain documents. In one embodiment, the business query language is directed specifically to searching out objects in a relational database. Knowledge of the relationships of the databases and the fields can be configured into the query engine logic. In one embodiment, the query engine logic exists within a backend interface in the program (e.g., via an extension or library), or in a backend interface on the platform (e.g., accessible to the program via one or more application programming interfaces (APIs)), or in a backend server accessible via one or more APIs or service interfaces.

Data pulled into the application can be in any of a variety of forms, such as a datapoint (e.g., a string, an integer), a table, a chart (e.g., pie chart, organizational chart), a graph, etc. In one embodiment, a form paragraph can be pulled into the document. The form paragraph may have several locations that "point to" other data objects, which are also pulled in with the form paragraph (thus, a populated paragraph may be inserted). Data in the document will be available as part of the document structure and will be available for reuse or can be refreshed to acquire the latest available data from the enterprise system of record.

In one embodiment, the query engine includes a flexible semantic layer that allows administrators to create new functions, edit existing ones, and modify end use behavior of functions. The administrators could also modify and/or add to system query syntax (e.g., SQL (structured query language) function calls to BAPIs (business application programming interfaces) or any other data retrieving syntax).

In one embodiment, the query engine is user-customizable, to enable a user experience that allows an end user to select relevant information (e.g., properties) that the end user would like to have in the query (e.g., reduce available fields from a predefined list). In one embodiment, the query engine is executed as an instance on the user device, and customizing the query interface can be performed for the single instance, or set as a default function for the object (e.g., in enterprise-level user settings). Thus, for example, a user can set up a default for the user for the pipeline function or customer object, etc.

In one embodiment, the user customization can allow a user to toggle between formula view or data view. The user could bring up or invoke the formula view using IntelliSense dropdown values or by typing it. Other alternative ways of using the query syntax are also possible.

FIG. 1 is a block diagram of an embodiment of system in which a business query can access an enterprise backend. System 100 includes business productivity application 110 (or "application 110"), in which a user performs work. Application 110 can be, for example, an email program, a word processing program, or a spreadsheet program. A user inputs input text 112, which, for example, may be the body of an email or a business document. In one embodiment, the user invokes a business query, which is used to insert query-embedded object 114. Object 114 may be any form of business object, with any type of display suitable for application 110, including data points, charts, tables, graphs, form paragraphs (which may include auto-population fields), etc. As used herein, a business object refers to a data object having a business application and/or purpose, and/or a use in an enterprise or organization. A data object is a fundamental building block of an application, and includes data with parameters or rules regarding its use or interaction with other information or functions. In one embodiment, a data object includes metadata that indicates one or more relationships between the data object and another data object, or between the data object and particular business actions or tasks, etc.

Input text 112 may be input before and after object 114. In one embodiment, a user invokes query 116. The query can be invoked in any of a number of manners, which may include tabs or right-click menu options. In one embodiment, invoking the query can be performed by simply inputting a defined sequence of keypresses (e.g., "Return#", or "###", or any sequence that may be expected to not have common use in the environment of application 110. The invoke query sequence 116 may be user-configurable.

Invoking the query 116 enables query interface 118 to be displayed, which allows the user to build the query. In one embodiment, query 118 provides selectable list 120, from which the user may select among items 1-3. In addition to, or alternatively to selectable list 120, query 118 may include or request one or more user-provided parameters 128, which a user can type directly into the interface. Parameter 128 may be provided as part of a query, for example, an item from selectable list 120 that requires a parameter input. Selecting an item from selectable list 120 may also initiate a sub-list associated with the selected item. For example, sub-list 122 includes item 2A, item 2B, and item 2C that are related, or further detailed from item 2 of list 120. Thus, the user can be guided through the query.

The query input through the interface is received by query processor 130, which represents any embodiment of a query engine as discussed herein. Query processor 130 may include software and/or hardware components, and receives and processes the query. Query processor 130 may exist as a component stored in a non-volatile storage and/or be loaded in volatile memory on the user device. In one embodiment, the query engine is a business extension for a program loaded on a user device. The query engine could alternatively be loaded as a standalone component that "plugs-in" to existing applications or programs. As illustrated, query processor 130 include backend interface 132, context determiner 134, selection filter 135, query suggester 136, object inserter 138, and related data module 139. There may be implementations where not all illustrated components are present, and there may be implementations where other components may be present. Thus, query processor 130 may be more complex, or less complex than shown in FIG. 1, and may include some, all, and/or different components than those illustrated. Each component represents a means to provide particular functionality.

Backend interface 132 provides the ability to interface the backend enterprise system, and may include APIs, SQL queries, or request interfaces according to any known (e.g., standard or open) or proprietary protocol. In an enterprise system, queries are often performed through the invoking of a communication agent that receives an input (e.g., parameters in an instantiation of the agent, as passed parameters in calling a function, etc.), and returns requested information. The logic associated with the agent or function call performs functions related to searching, mining, selecting, or otherwise accessing an enterprise backend. The backend may include one or more databases and/or file structures where data objects are stored. In addition, or alternatively, to data storage, the backend may include one or more web services that are available to query processor 130, which could invoke the web service with any of a number of different query types, as is understood in the art. The backend is generally accessible via an enterprise server. In one embodiment, one or more components of query processor 130 are part of an enterprise server. Query processor 130 is coupled to enterprise server 140, which includes data store 142, and/or one or more web services 144.

Context determiner 134 enables query processor 130 to determine a context from which or in which the query is generated. The query can be serviced based on the context. Servicing the context may include the manner in which the query is processed as well as the data that is returned, and the manner in which data is returned. In one embodiment, context determiner 134 determines context from context metadata 102. Context metadata 102 may exist for each project, for each user, for a workflow task, etc. Thus, for example, metadata may be present in the system because a particular user (certain information available for the user) is working on a particular project (other information available for the project). Query processor 130 reads context metadata 102 to have information on a user's credentials and security/access rights, and/or to have information on a business area (e.g., sales) related to a project, and/or to have information on a workflow task being performed. Metadata 102 can be obtained from different sources, or all from a single file (e.g., an XML file generated by a system about a project). Note that metadata 102 can be attached with a key phrase or project name that is recognized by the system, or a user can "access" a certain project and "operate on" the project, which may include signing on to the project, checking the project out, etc. Each element of metadata can affect what options are available on suggested lists or pulldown menus, and/or what parameters the query requires. Context may also be determined from form, or be indicated by the use of a particular template or form, or via startup of an application through a particular icon or network location (e.g., monthly budget reports are performed with an application launched from a particular location). The context can drive what suggestions are provided to the user to guide the query, and may restrict what enterprise data/services are available to the user.

Selection filter 135 applies context information to limit access to particular databases/objects in the query. Selection filter 135 can also filter accessed data to determine security rights of a user to determine whether the data can be inserted. Selection filter may also determine, based on what selection is made from a query list, or what input is received (e.g., whether the input is a name, matches a known type, etc.), what additional options to provide in the query interface, or whether the query is complete. Query suggester 136 applies context information to provide in the query interface the options available to a user, based on a query state in which a user's query currently exists and the context information.

Object inserter 138 retrieves an object in response to a query and inserts the object into the user environment. In one embodiment, all data objects are stored in a standards-based format (e.g., XML (extensible markup language)), and can be inserted in any application that supports the standard. Many business productivity applications (including ADOBE SYSTEMS, INC., of San Jose, Calif.) support the insertion of objects into documents. Object inserter 138 provides interfaces and functionality necessary to insert a data object directly into application 110 in response to a query.

Related data module 139 enables the interaction with and access to data related to an inserted or embedded object. For example, object 114 is inserted in application 110 in response to a query. Selection of object 114 within the environment of application 110 can enable the user to interact with the object. The object can be updated/refreshed. Additional data related to the data object can also be accessed and provided for display as related data 124. Related data 124 may include text and/or graphics to present the information. Relatedness data stored with business objects may indicate other data that is related to or frequently used with particular business objects, and can be used as related data 124. Such information can be stored with the business object. When the object is inserted into application 110, the related information can be retrieved and shown to a user without the need to switch environments (e.g., another application does not need to be opened). Object 114 can be selected via mouse-over, right-clicking, or other methods.

In one embodiment, application 110 includes business process extension 126, which enables application 110 with a connection to workflows and other business process data. Business process extension 126 can be constantly present when application 110 is open, or can be brought up when information is selected. Business process information can be selected off of object 114 or related data 124. Business process extension 126 enables application 110 to provide additional functionality and/or information for a user, specifically, information related to business processes related to the object.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 2A:
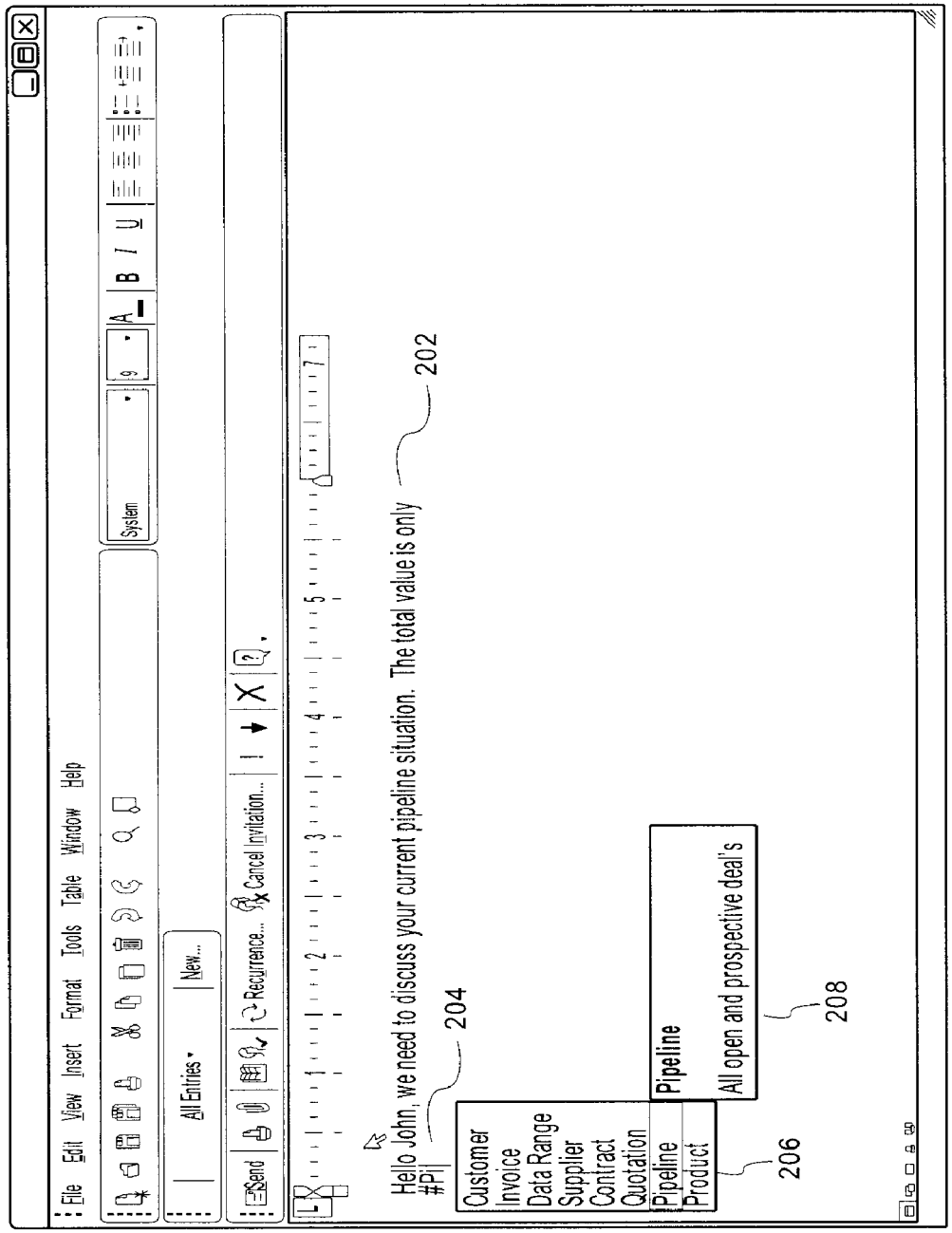
FIGS. 2A-2F illustrate example screen shots of an embodiment of a business query invocation in an email program to input a text-based business object.

FIGS. 2A-2F illustrate example screen shots of an embodiment of a business query invocation in an email program to input a text-based business object. The application illustrated in FIG. 2 may be any type of email program, and may be a word processing program with an email drafting feature (e.g., products available from Microsoft Corporation). Despite the specific example, the program as illustrated could be any business productivity application. Within the email program a user inputs text. As shown in FIG. 2A, user text 202 is provided by the user within the context of the email program. Also within the context of the program, query 204 is invoked. Although referred to as a query, query 204 can also be understood as representing the interface with which a user invokes a query from the query engine. In one embodiment, query 204 is invoked with a '#' symbol followed directly by a letter. Other keystroke sequences could be used to invoke the query, including symbol and/or alphanumeric combinations, as well as combinations involving function (e.g., shift, control, alt) keys.

In one embodiment, query 204 has a fixed number of possible options, which may include, for example, "Customer," "Invoice," "Date Range," "Supplier," "Contract," "Quotation," "Pipeline," "Product," and/or any other field or type of query configured in a system. As shown, the entered letters "Pi" correspond to the first letter of "Pipeline," which may automatically highlight "Pipeline" from selection list 206. Selection list 206 may appear on the screen as soon as query 204 is invoked. Alternatively to automatically highlighting or selecting a field via typing, invoking the query may bring up selection list 206, which a user can navigate via a mouse or other cursor control mechanism. In one embodiment, highlighting a selection from selection list 206 invokes a system-level description, explanation, or definition. For example, "Pipeline" may be described in description 208 as "All open and prospective deals." The providing of description 208 can guide a user through the query process, and provide standard understanding of the meaning of terms for users of the query. When the highlighted item of selection list 206 is selected via a "clicking" or via the user pressing "Enter" or "Return," the field "Pipeline" is inserted into query 204.

Figure 2B:
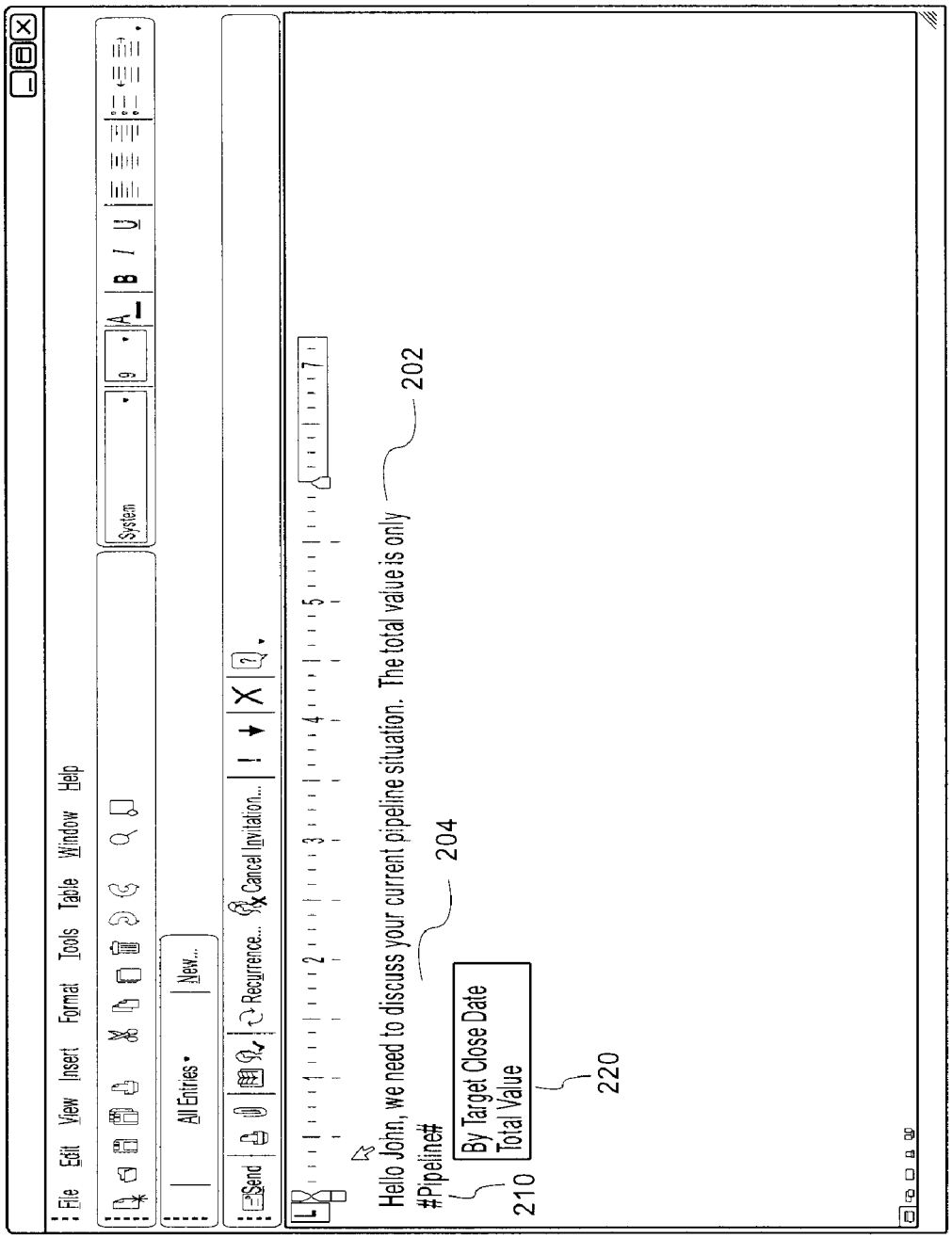

FIG. 2B illustrates the insertion of "Pipeline" into field 210 of query 204 within the context of the program. Note that the context of the program does not need to be changed to accommodate the inputting of the query. In the process of the query, "Pipeline" field 210 may represent a first state that requires other information (a second state) in order to complete a query. For example, "Pipeline" may have meaning within the system under the selections of "By Target Close Date," or "TotalValue," as provided in a selection box associated with field 220. That is, within the backend enterprise system from which data is to be accessed, "Pipeline" data may be searchable only via information about the total value or target close date. Thus, query 204 requires input regarding which of the possible selections are desired within the query.

Figure 2C:
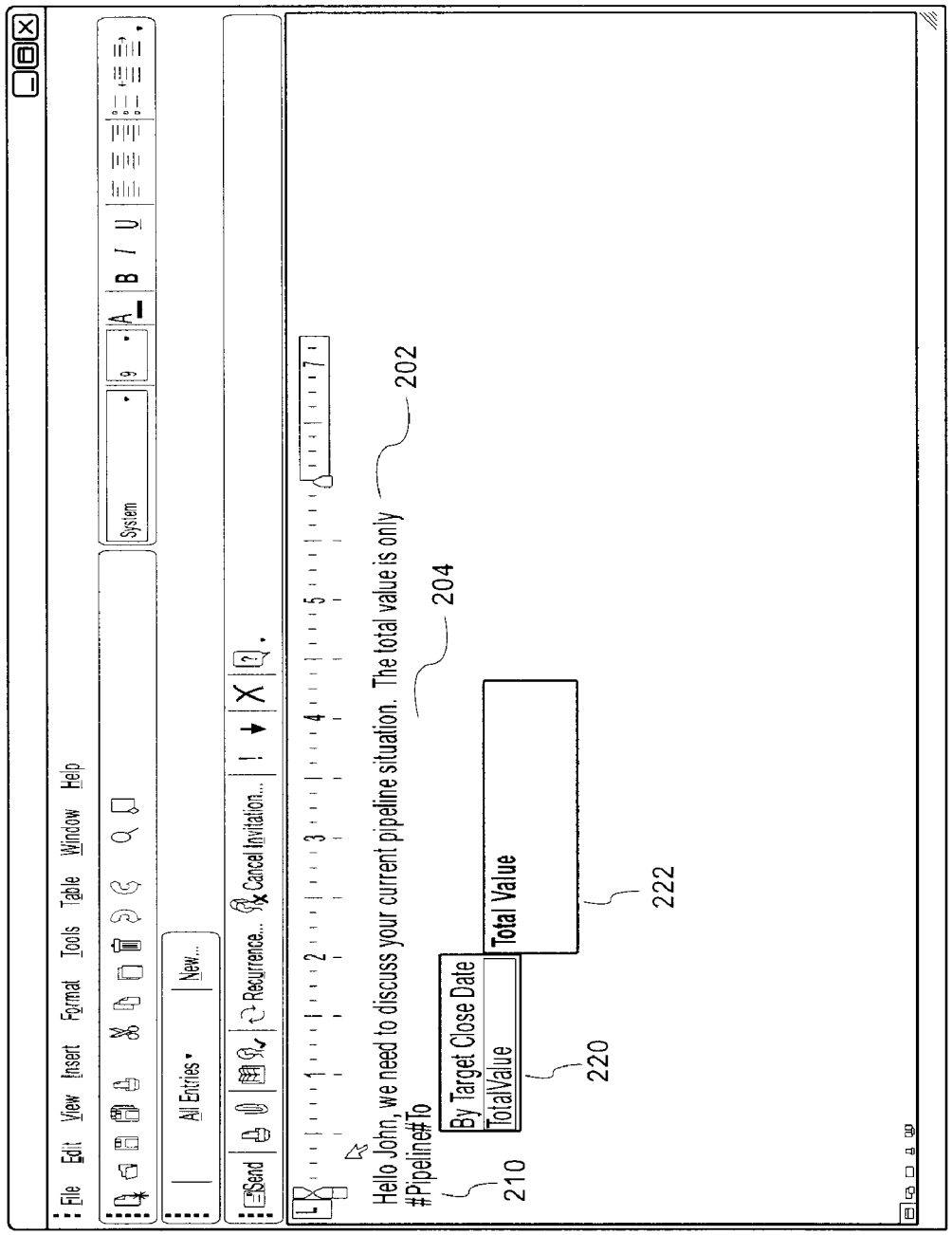

FIG. 2C illustrates a selection of the "TotalValue" item of the selection box of field 220, which may produce description box 222. Certain items may be considered by a system designer to be intuitive or otherwise not need further description from. Thus, in one embodiment, selection of an item in a selection list may not provide further details. As illustrated, description box 222 does not provide a system-specific definition for the term "Total Value". However, a definition or description could be provided.

Figure 2D:
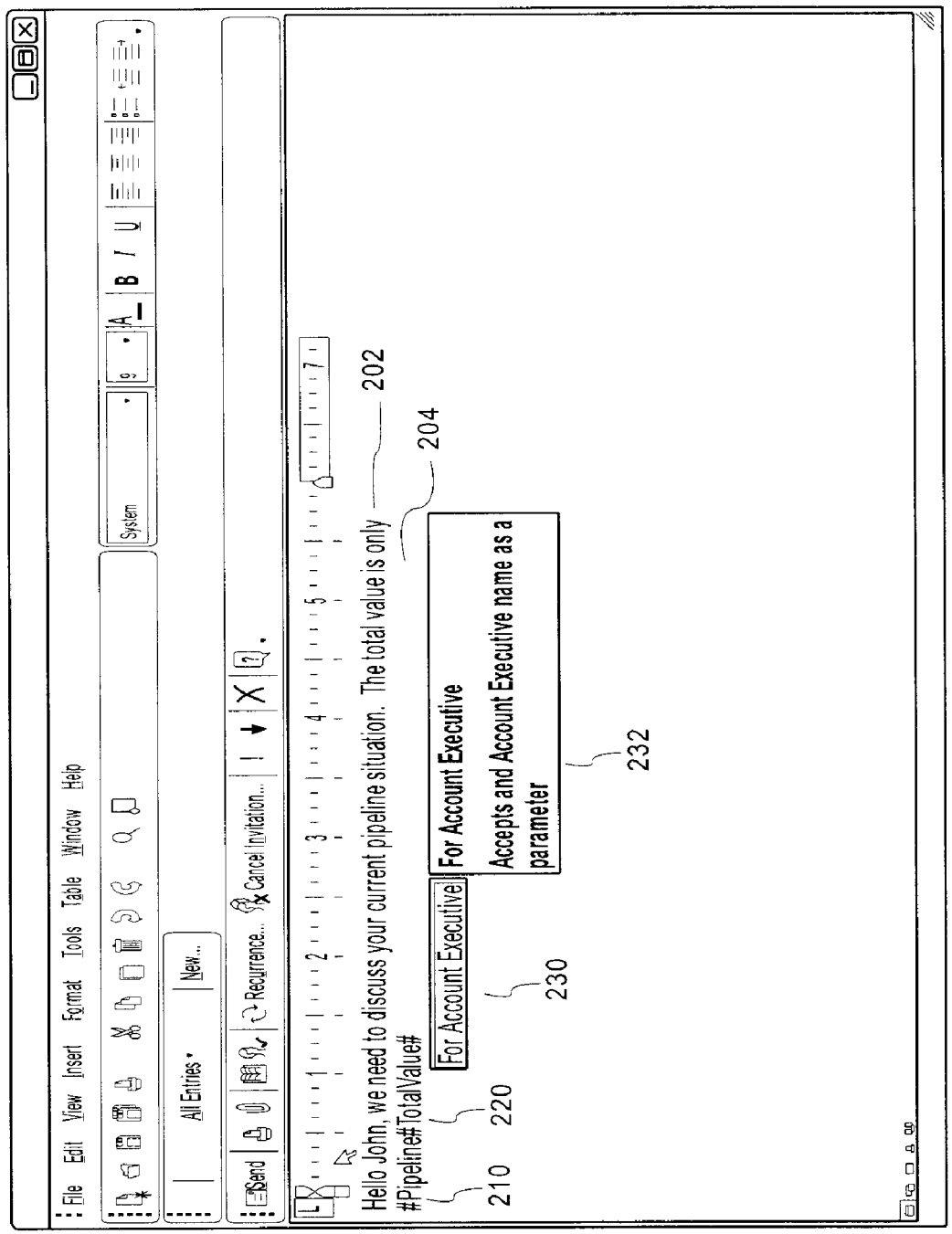

Selection of "TotalValue" from the selection box inputs "TotalValue" into field 220 in query 204, as illustrated in FIG. 2D. In one embodiment, a second state for "TotalValue" is required. Thus, a guided selection "For Account Executive" appears as field 230 of query 204, which may display description box 232. Rather than provide a definition of "For Account Executive," description box 232 guides the query by indicating the type of data required to be inputted into the field. Specifically, description box 232 indicates that field 230 "accepts an account executive name as a parameter."

Figure 2E:
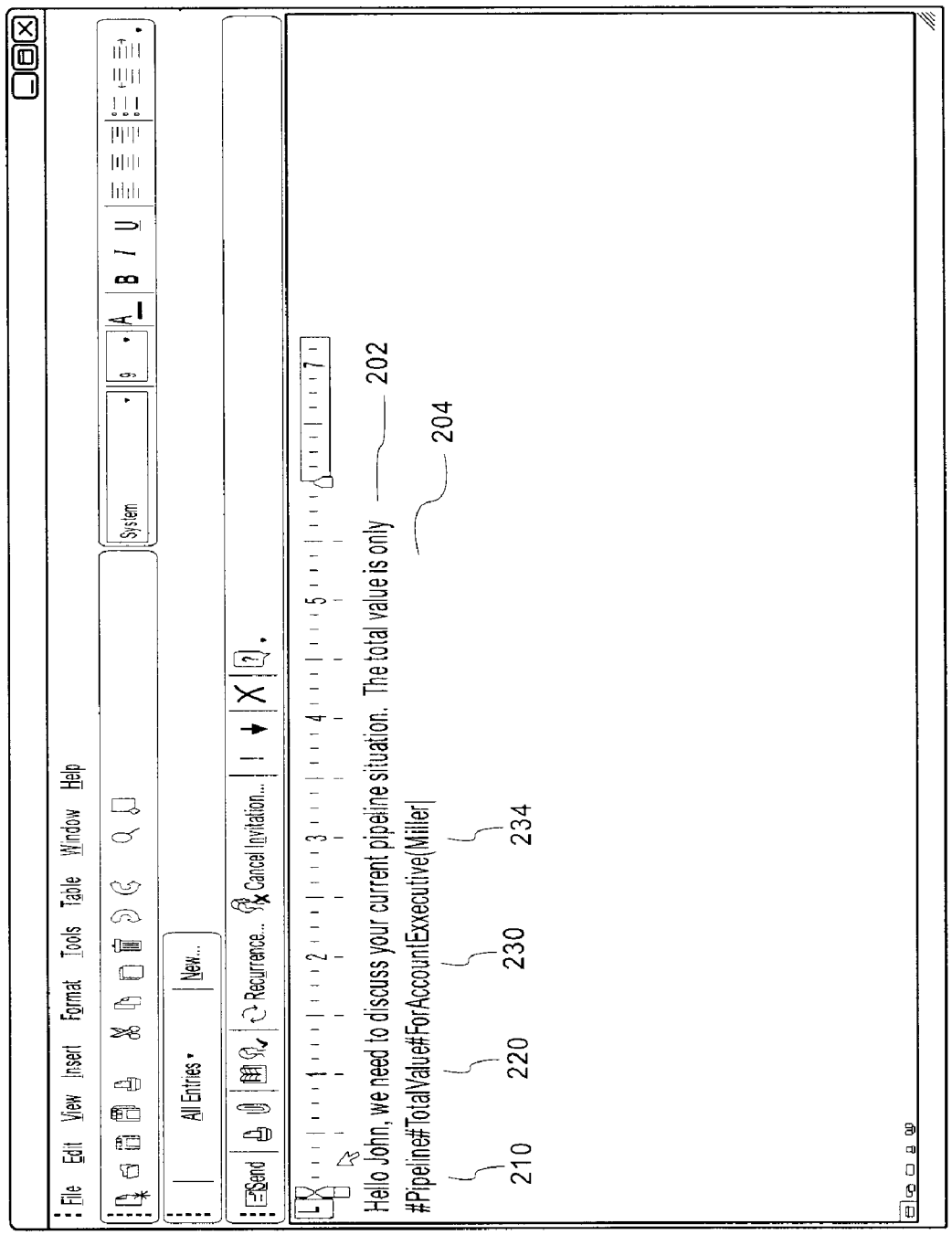
Figure 2F:
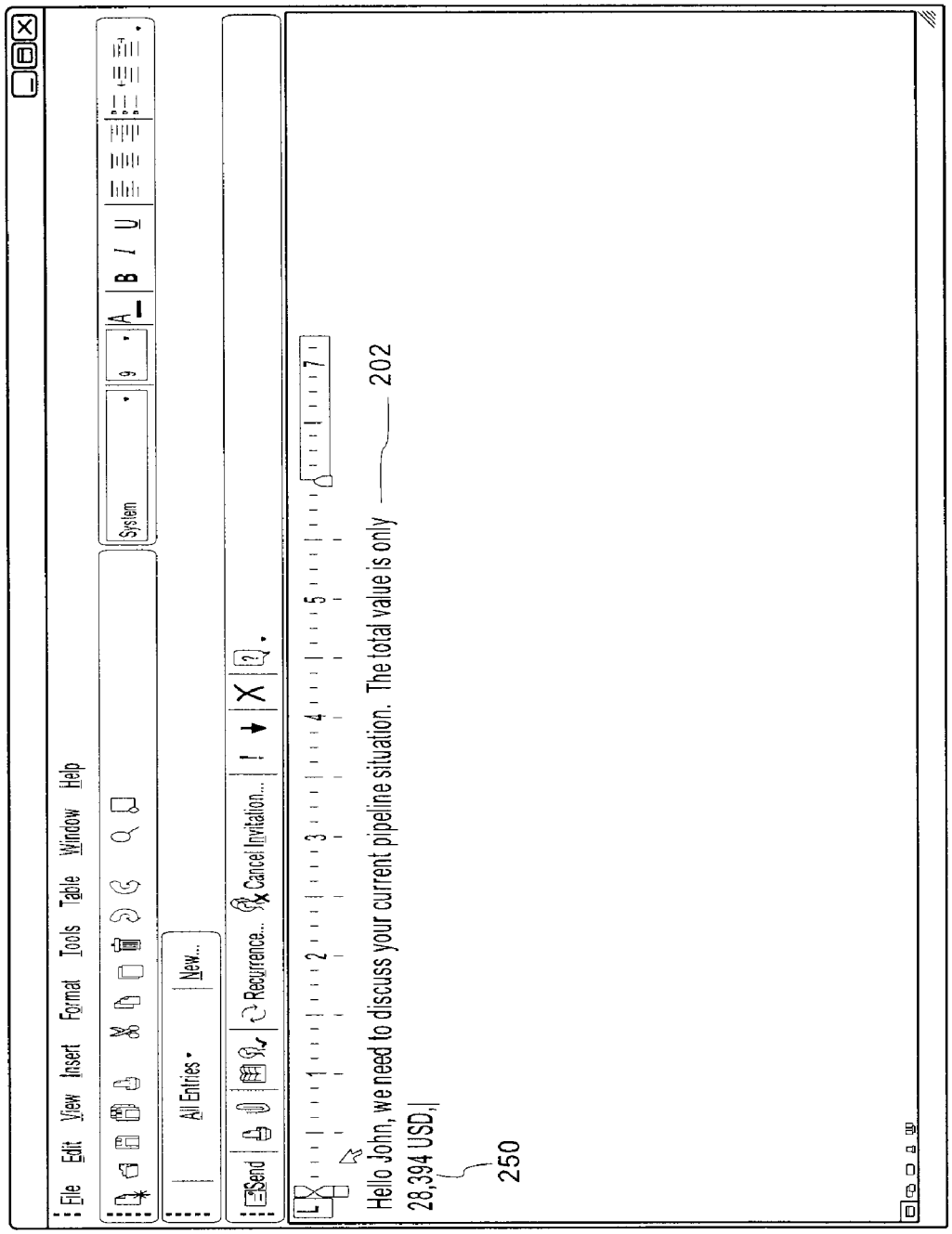

FIG. 2E illustrates the inputting (via typing), the account executive parameter 234 of "Miller." In the example provided, the inclusion of the parameter "Miller" completes query 204. The query engine is then initiated or triggered to access the enterprise backend and retrieve one or more data objects associated with the a value that satisfies the query #Pipeline#TotalValue#ForAccountExecutive(Miller). FIG. 2F illustrates the insertion by the query engine of the accessed data object 250, which has a value of 28,394 USD. The object is embedded directly into the document of the program from which the query was invoked. Note that the embedded object can be persisted and transferred with the document generated in the program.

FIGS. 3A-3I illustrate example screen shots of an embodiment of a business query invocation in an email program to input a table object. The program of FIG. 3A includes input text 302, which may include one or more embedded objects, including an object inputted via a query as described herein. For purposes of illustration, input text 302 includes object 250 provided into the program via the query of FIG. 2. A user can continue to input text or other information after the embedding of a data object. The user can embed a data object within the context of the program, and continue working within the context of the program, without having to switch screens, "hunt" for data, copy, etc. Rather, the query engine assists in providing the requested data, and the user can generate more input text 304.

Figure 3A:
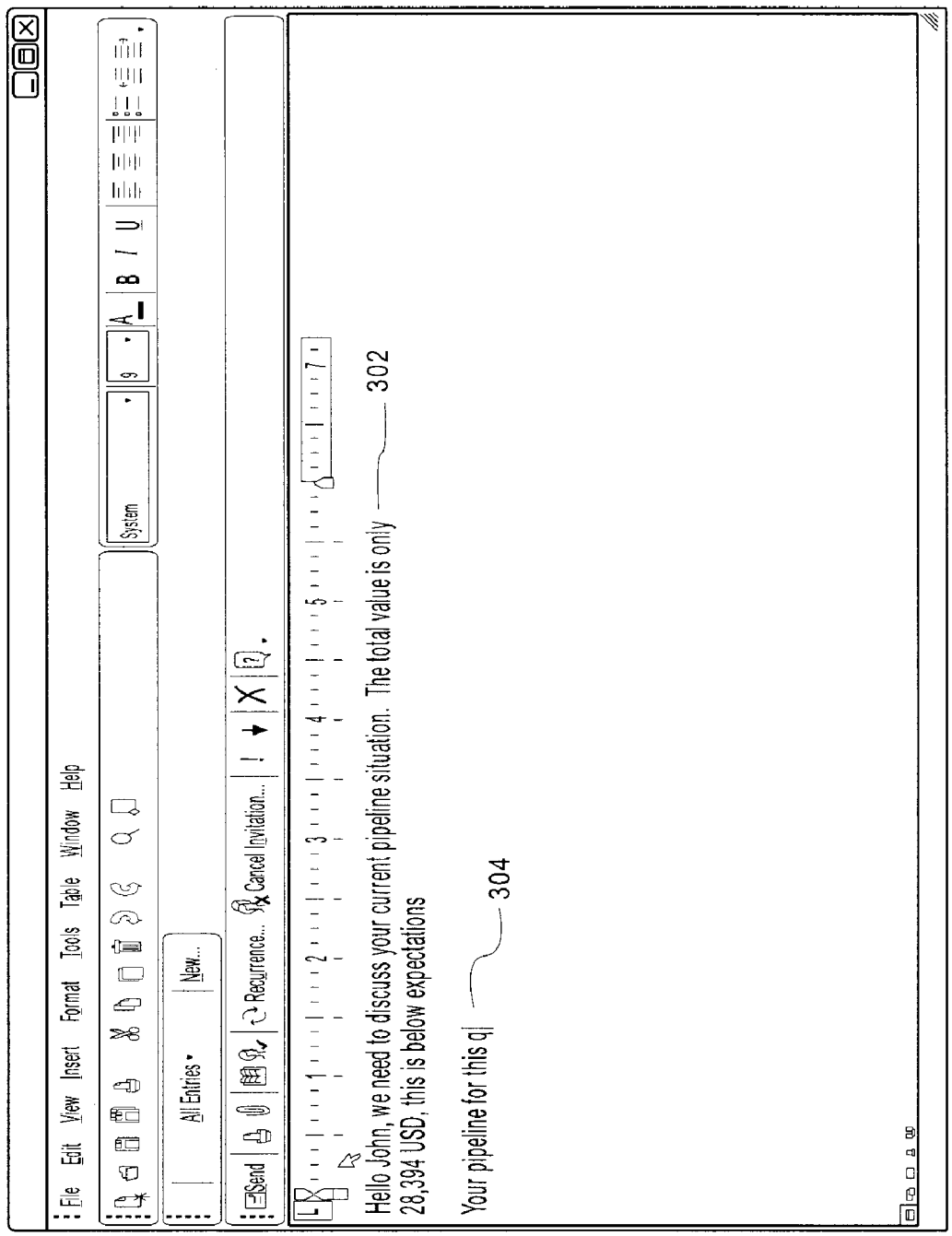
FIGS. 3A-3I illustrate example screen shots of an embodiment of a business query invocation in an email program to input a table object.
Figure 3B:
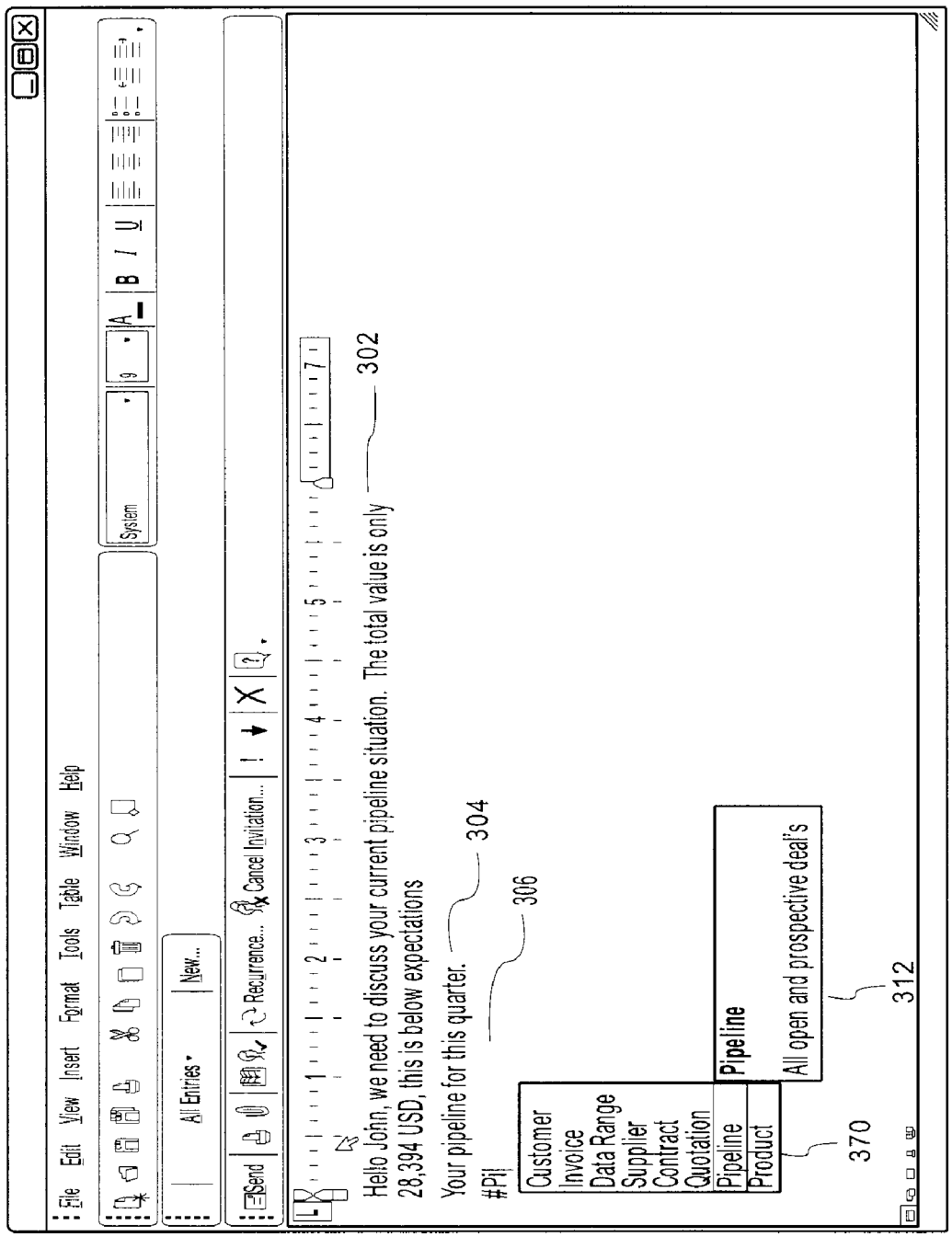
Figure 3C:
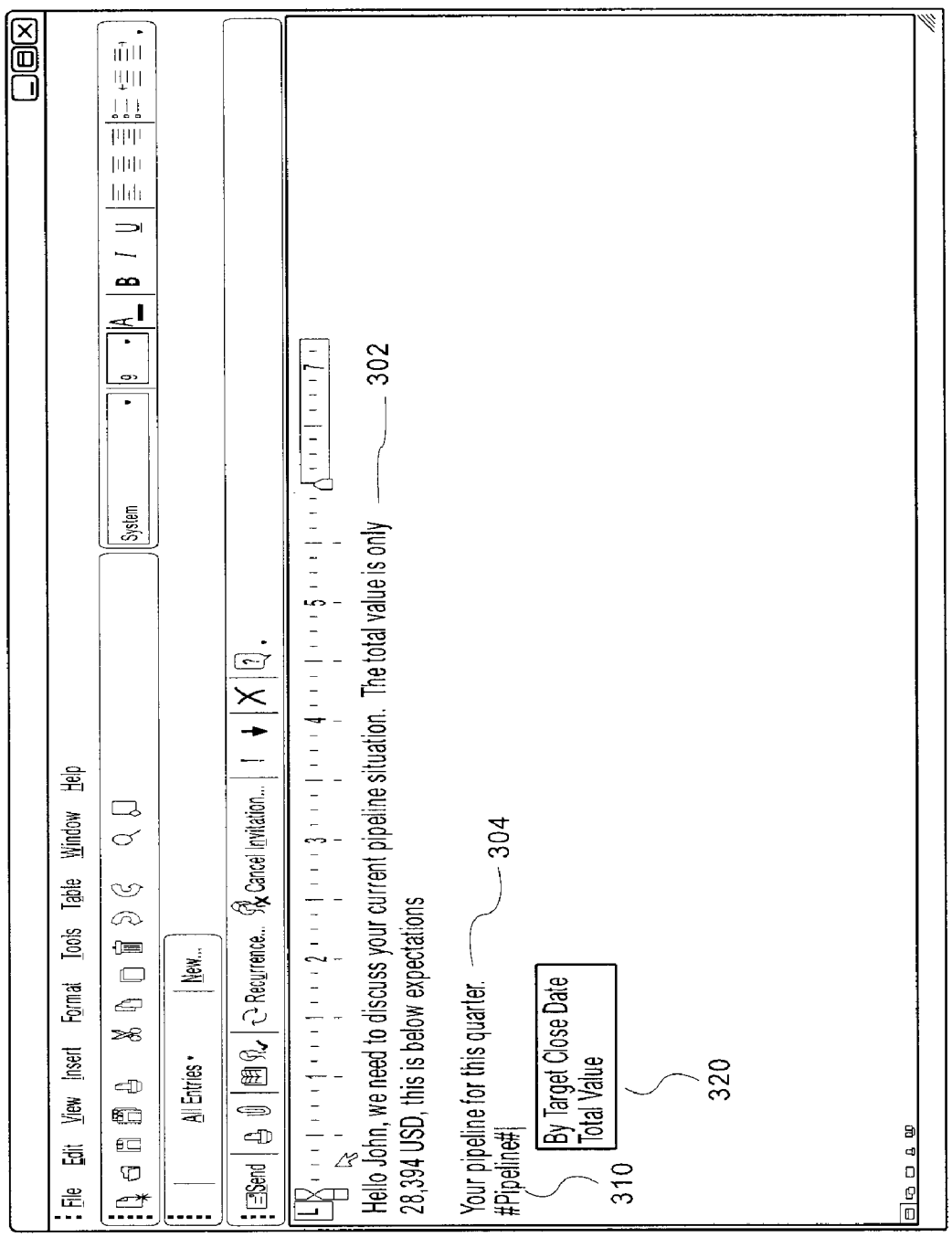
Figure 3D:
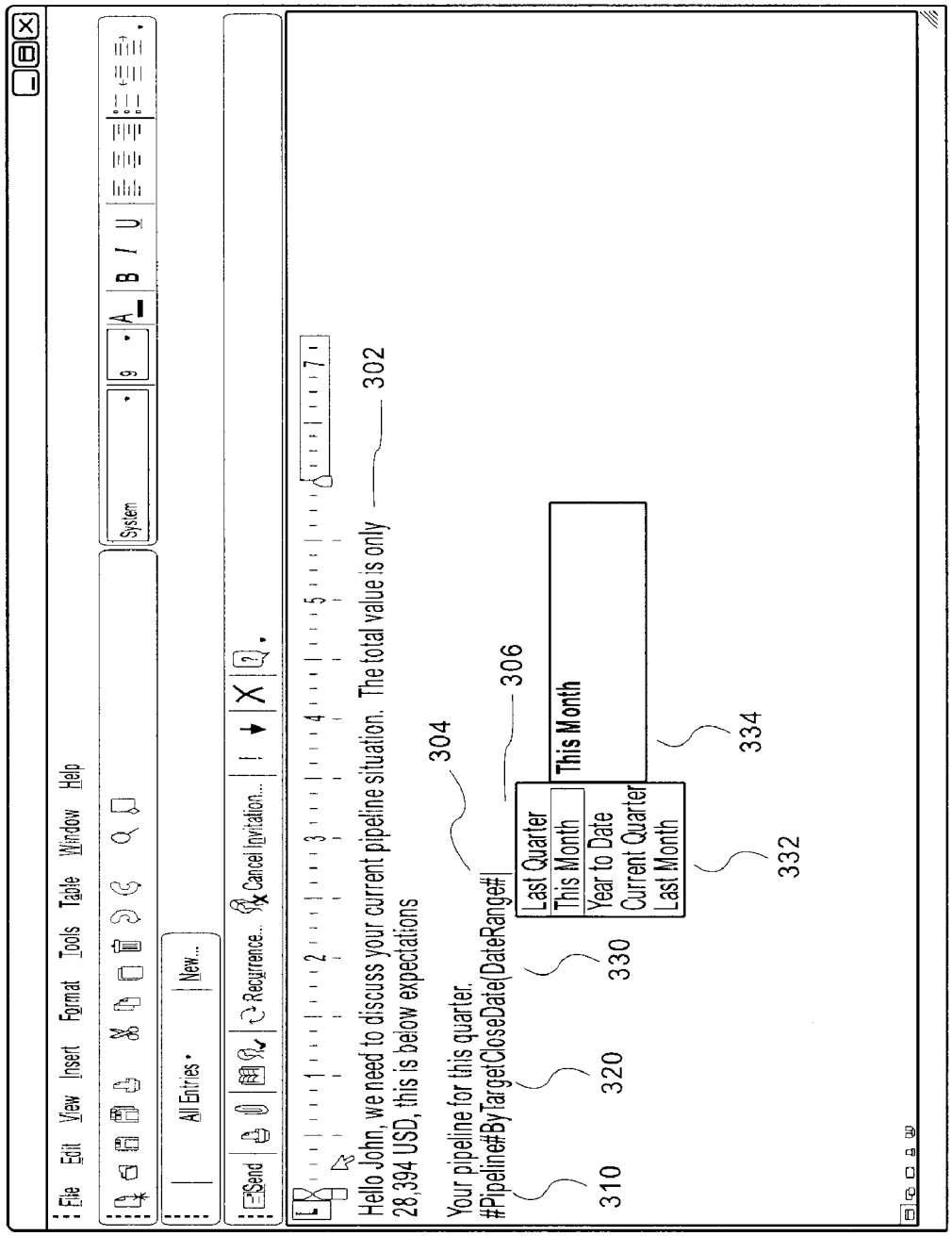

FIG. 3B illustrates the user invoking query 306. Invoking the query may invoke a selection list associated with field 310, from which the user may select among the listed items. Highlighting "Pipeline" may invoke the query engine to provide description box 312, which describes the "Pipeline" as "All open and prospective deals." In FIG. 3C, query field 310 includes the term "Pipeline," which may invoke another state, as provided in a selection box associated with field 320. In FIG. 3D, selection of "By Target Close Date" inputs such a parameter into query field 320. Field 320 with the target close data may then require additional input. The input is solicited via field 330, which includes the expression "DateRange."

Figure 3E:
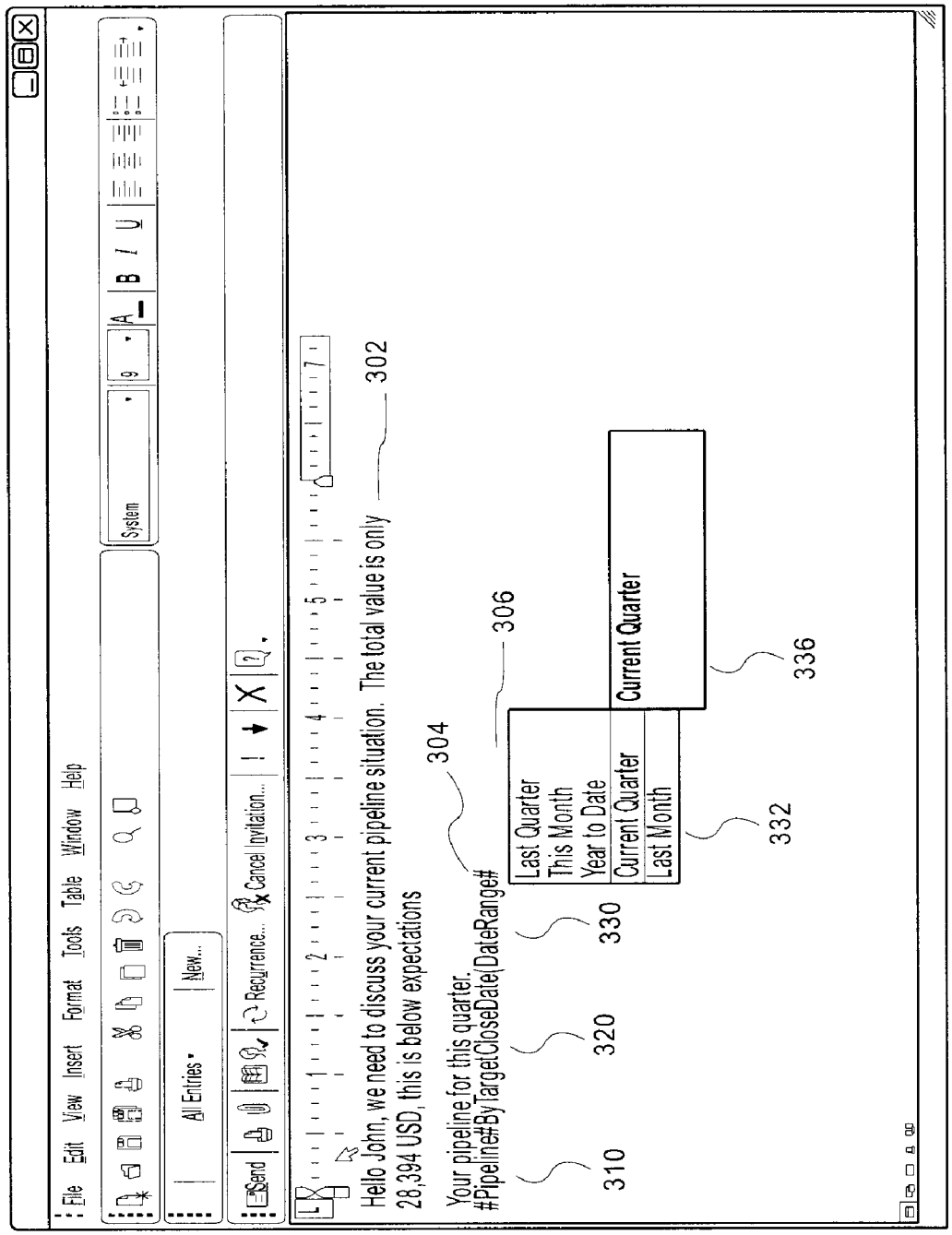

Data range field 330 requires additional information, which may be inputted in some cases, or may be selected from predefined ranges in selection list 332. Selection list 332 includes options such as "Last Quarter," "This Month," "Year to Date," "Current Quarter," and "Last Month." Note that any type of date range may be defined (e.g., previously 4 weeks, last 8 weeks, etc.). Highlighting "This Month" generates description box 334, which may or may not have system-specific description information. In one embodiment, "This Month" is a default selection, and selection list 332 is generated with the default item "This Month" highlighted. In FIG. 3E, it is illustrated that a user can select the default item, or move up and/or down the list via mouse, arrow keys, or other cursor control mechanism, to highlight the item "Current Quarter" of the list. Note that again a description box 336 may be provided in response to highlighting the item on the list.

Figure 3F:
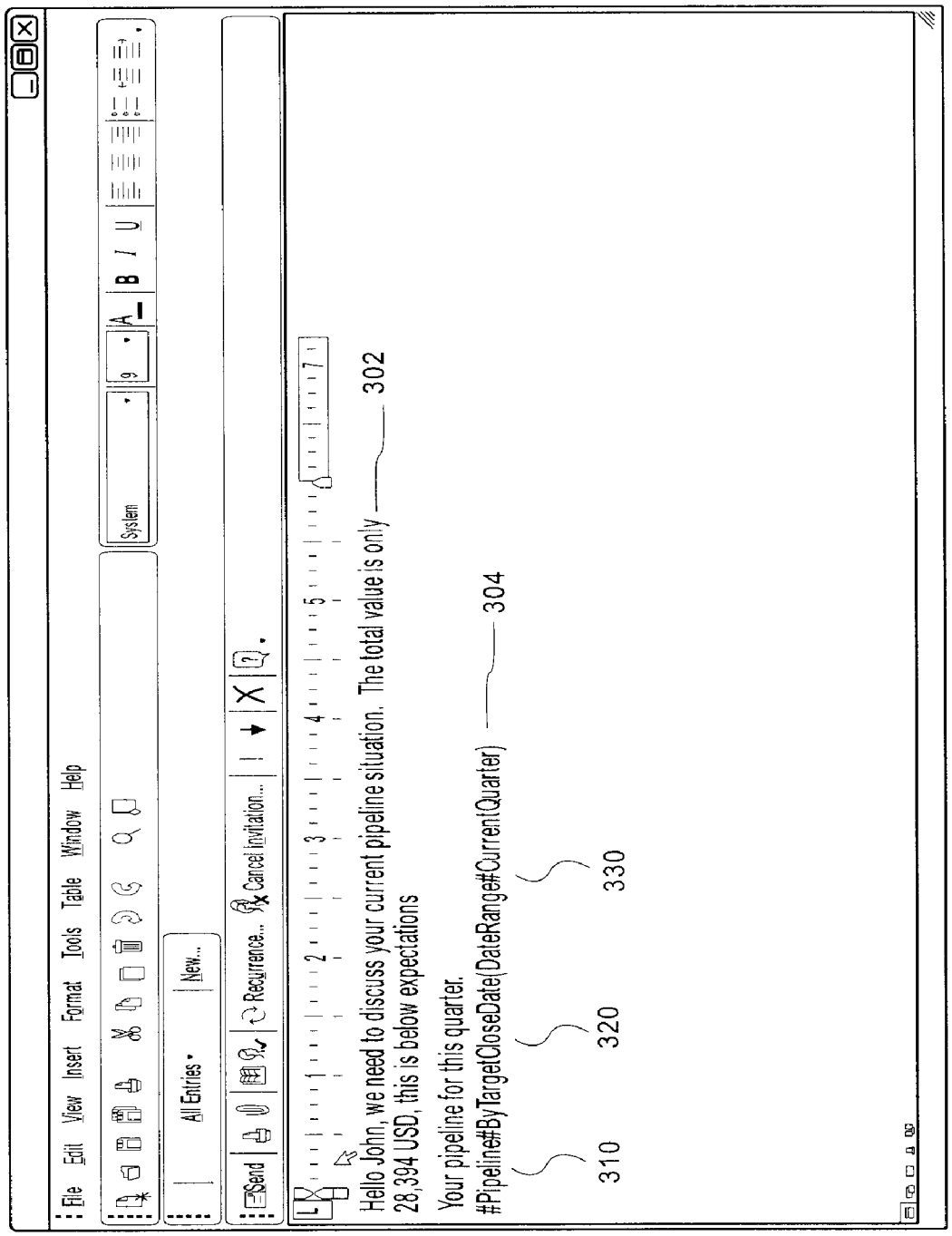
Figure 3G:
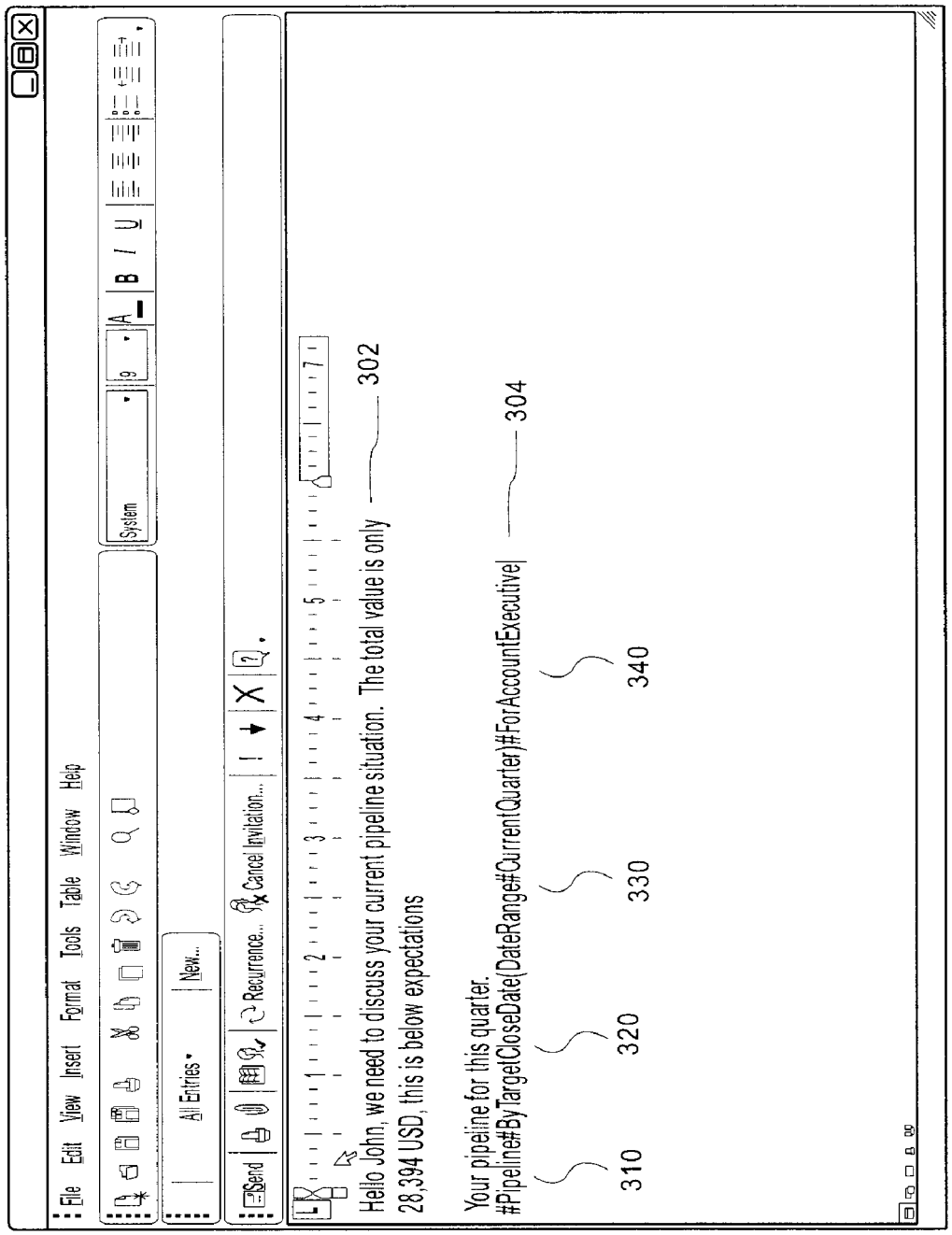
Figure 3H:
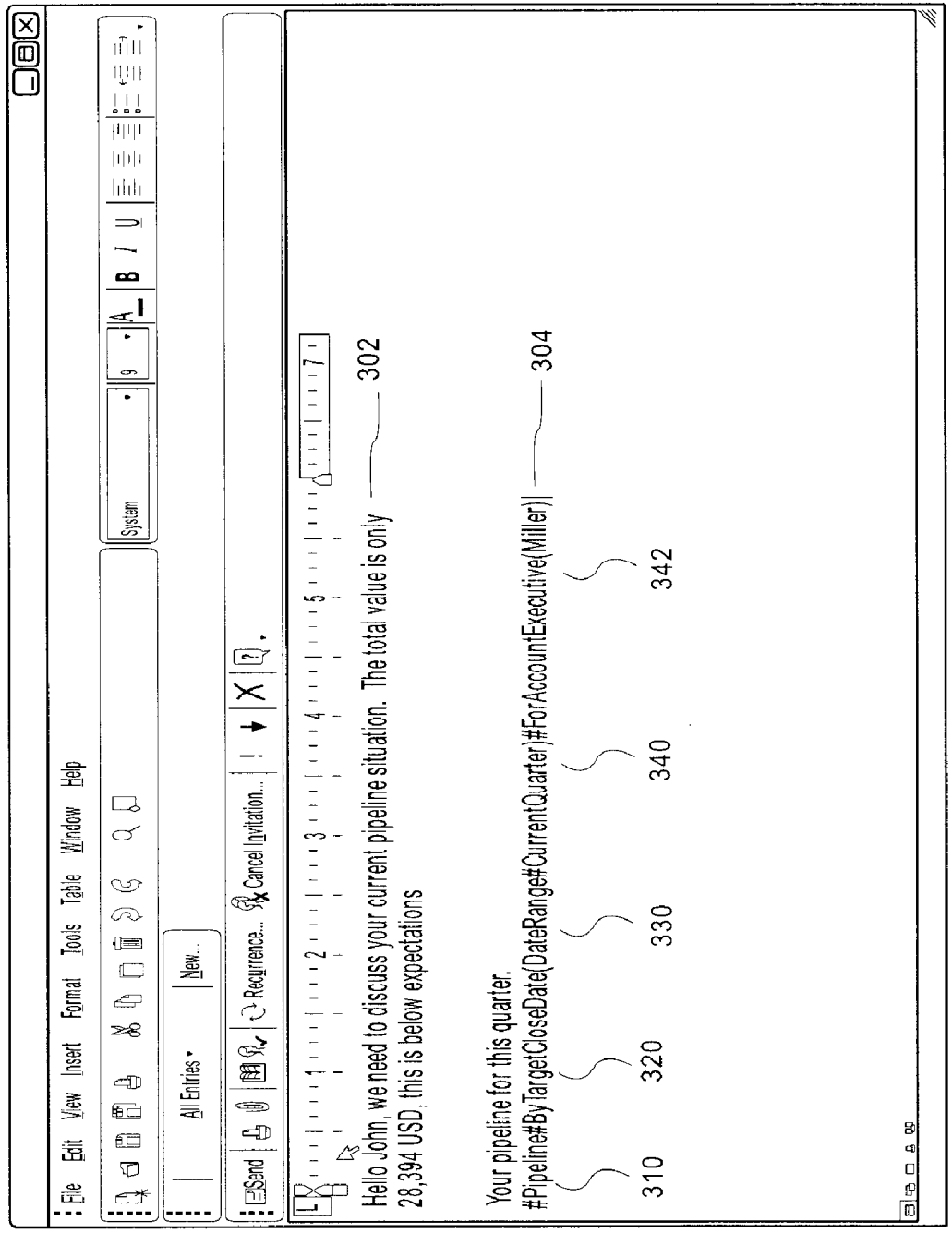
Figure 3I:
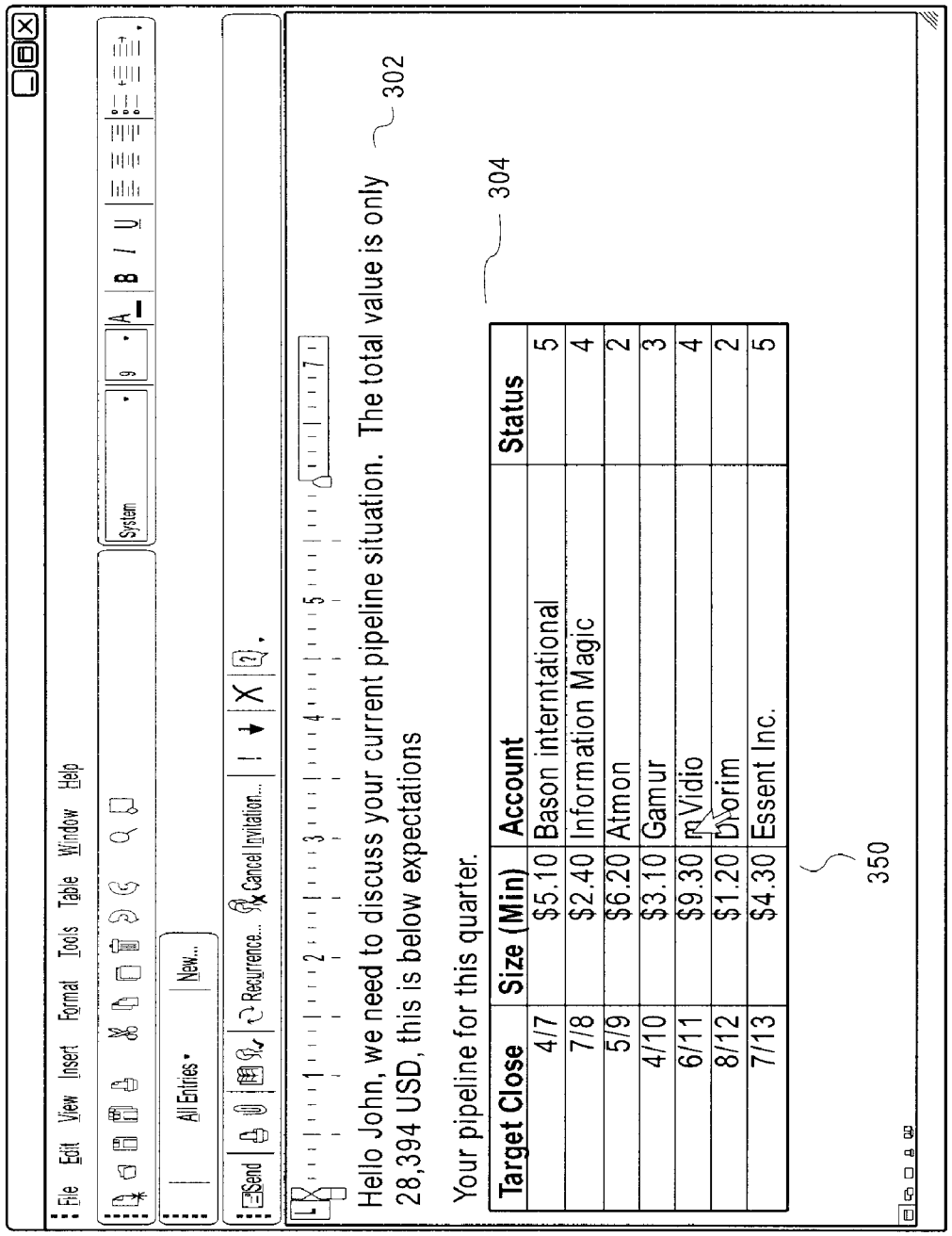

FIG. 3F illustrates query 306 with the field 333 having "DateRange#CurrentQuarter," showing the selection of the "Current Quarter" item of selection list 332. The query may still be incomplete, and require other specific parameters in order to locate a data object of interest. Thus, in FIG. 3G, query 306 further includes field 340, which requests input to identify a specific "AccountExecutive" to which the remainder of the query is to be applied. In FIG. 3H, query 306 is provided with the name "Miller" to identify the account executive to whom the query is to be applied. In one embodiment, the query engine may include persistence of data that provides convenience in further queries. For example, Account Executive Miller was selected in the query of FIG. 2, which could be persisted by the query engine as the "last inputted" data for that particular field. Thus, in one embodiment, "Miller" is automatically suggested or provided by the query engine as parameter 342 in query 306. The user can change the suggested parameter by typing in another name/identifier, or can accept the suggestion of the query engine. With the inputting of "Miller" as parameter 342, the query may be complete, and provide the information needed by the query engine to seek for a specific data object in the backend. FIG. 3I illustrates the results of the query, in which the query engine has accessed and embedded table object 350, which includes multiple data objects.

Figure 4:
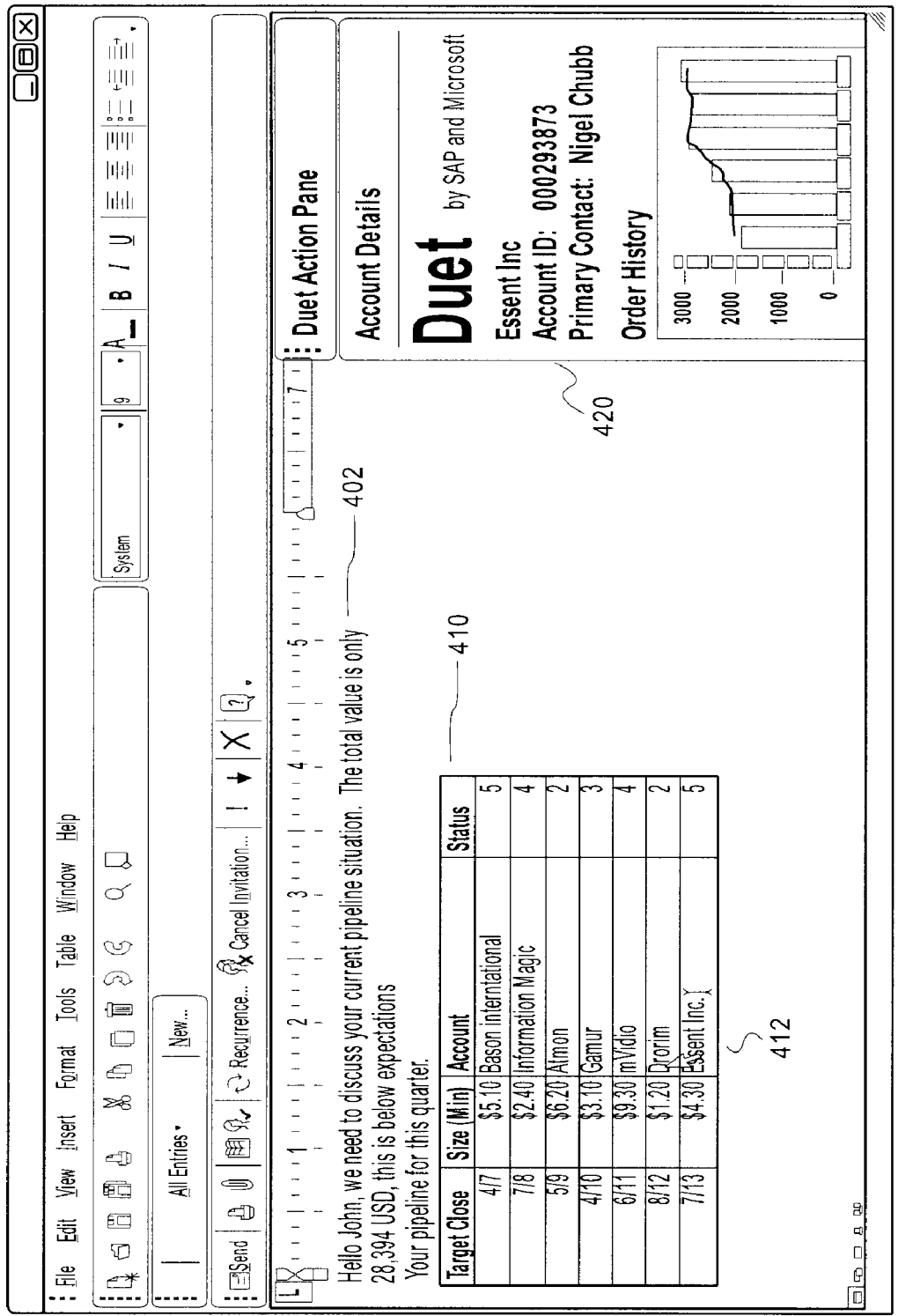
FIG. 4 illustrates an example screen shot of an embodiment of a business query invocation integrated with a business process extension function.

FIG. 4 illustrates an example screen shot of an embodiment of a business query invocation integrated with a business process extension function. The program as illustrated may include any information. For purposes of further description, the program illustrates section 402 having a data object retrieved from the backend and embedded in the context of the program via the query engine, as shown in FIG. 2. Also, from FIG. 3, embedded object 410 provides a tabular view of data, which includes a column labeled "Account." The Account column identifies various account owners, including the cell at the bottom of object 410, which identifies "Essent Inc."

In one embodiment, in addition to supporting a business query as described herein, a business productivity function may be enabled with a business process extension, as described in U.S. patent application Ser. No. 11/350,294, having the same corporate assignee. The business process extension enables a user to access workflows and business processes directly from a business productivity application (e.g., the "Duet" option available as a joint venture between SAP AG of Walldorf, Germany, and Microsoft Corporation). As shown, both technologies can be merged. A selection of "Essent Inc." from the "Account" field in embedded table 410 may trigger the opening of an action pane. The action pane or "Duet pane" can provide additional details of the selected object. Options available in the Duet pane may include, among others, object details, order history, actions (that can be performed with respect to the object), and related reports (that can be generated with respect to the object).

Figure 5:
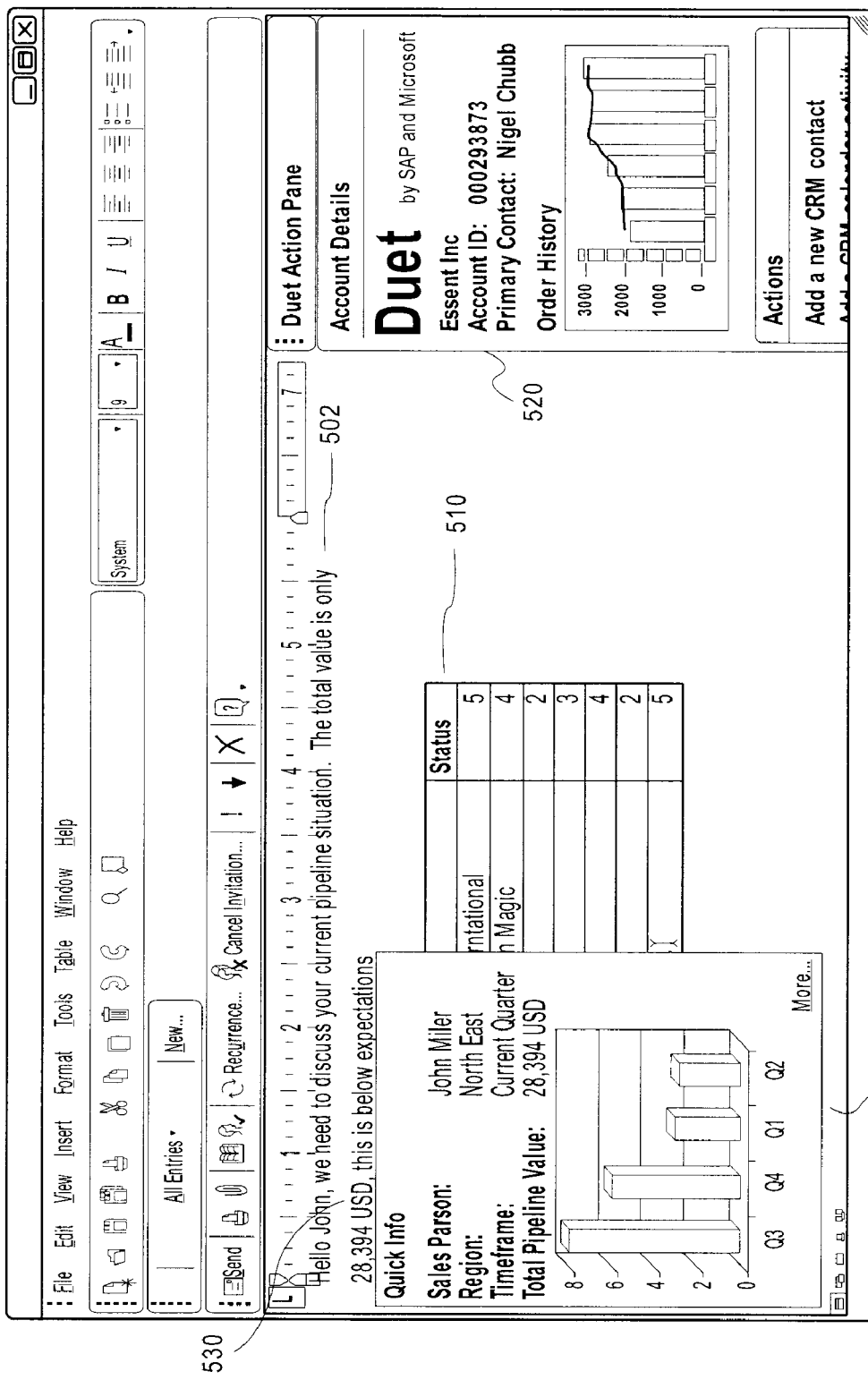
FIG. 5 illustrates an example screen shot of an embodiment of a business query invocation that provides a related object to a queried object.

FIG. 5 illustrates an example screen shot of an embodiment of a business query invocation that provides a related object to a queried object. Note that as mentioned above, once an object is placed in or embedded in an application or program, or document generated in the context of a program, the object may be available for any use. In one embodiment, related information can be retrieved and displayed for inserted data. As illustrated, the program includes input text 502 with embedded object 510, which is a data object representing the value of a backend query #Pipeline#TotalValue#ForAccountExecutive(Miller). By mousing over object 510, additional information can be displayed that is related to the object. As used herein, "mousing over" an item refers to moving a visual representation of a cursor over a visual representation of the item in a graphical user interface (GUI), and waiting for a period of time. A mouse-over may also be substituted by another mechanism of selecting the object (e.g., a "right click" or other functional selection). For example, the individual to which the object applies is identified, along with business-relevant details (e.g., sales region), and other information. In one embodiment, a graphical component may be included in addition to text. In one embodiment, related data is provided through the use of relatedness information, for example, as described in U.S. patent application Ser. No. 11/412,255, having the same corporate assignee.

Besides what is described herein, various modifications may be made to the disclosed embodiments and implementations of the invention without departing from their scope. Therefore, the illustrations and examples herein should be construed in an illustrative, and not a restrictive sense. Additional material attached hereto provides further details and more concepts that are part of this disclosure. The scope of the invention can be identified based on the materials herein, as well as the claims that follow.

What is claimed is:

1. A method for a structured business query language, comprising:
   providing a structured business query construct based on a business context of a business productivity application during runtime of the business productivity application in response to a character sequence inputted directly into the business productivity application;
   receiving, in response to providing the structured business query construct, an input query from within the business productivity application;
   accessing a business object in response to the input query; and
   replacing the character sequence within the application in response to the input query by inserting the business object into the business productivity application in place of the character sequence.

2. The method of claim 1, wherein providing the structured business query construct comprises:
   providing a guided procedure.

3. The method of claim 1, wherein providing the structured business query construct based on the business context comprises:
   providing a selectable list of input query items based on the business context in response to the character sequence.

4. The method of claim 1, wherein providing the structured business query construct based on the business context comprises:
   providing the structured business query construct based on a security privilege of a user of the business productivity application.

5. The method of claim 1, wherein providing the structured business query construct based on the business context comprises:
   providing the structured business query construct based on a business role of a user of the business productivity application.

6. The method of claim 1, wherein providing the structured business query construct based on the business context comprises:
   providing the structured business query construct based on a context defined by metadata associated with an environment of the business productivity application.

7. The method of claim 6, wherein providing the structured business query construct based on the context defined by the metadata comprises:
   providing the structured business query construct based on how an environment of the business productivity application was instantiated.

8. The method of claim 1, wherein the business productivity application comprises one of an email program, a spreadsheet program, a word processing program, or a slide presentation program.

9. The method of claim 1, wherein receiving the input query comprises:
   receiving a selection of an item of a hierarchical selection tree.

10. The method of claim 1, wherein accessing the business object comprises:
    accessing a web service.

11. The method of claim 1, wherein accessing the business object comprises:
    accessing enterprise level data from a backend system.

12. The method of claim 1, wherein inserting the business object into the business productivity application comprises:
    inserting a representation of the business object into the business productivity application, the representation having a non-text component.

13. The method of claim 1, wherein inserting the business object into the business productivity application comprises:
    inserting one or more of a data point, a chart, a table, a graph, or a populated form paragraph.

14. The method of claim 1, further comprising:
    accessing related data that is related to the business object; and
    presenting the related data in the business productivity application environment.

15. The method of claim 14, wherein the related data is accessed in response to a mouse-over of the inserted business object.

16. The method of claim 14, wherein the related data is accessed in response to a selection of a component of a representation of the inserted business object.

17. The method of claim 14, wherein presenting the related data comprises:
    presenting the related data in a pop-up window.

18. The method of claim 14, wherein presenting the related data comprises:
    invoking a business process extension of the business productivity application.

19. An article of manufacture comprising a machine readable medium having content stored thereon to provide instructions to cause a machine to perform operations including:
    providing a structured business query construct based on a business context of a business productivity application during runtime of the business productivity application in response to a character sequence inputted directly into the business productivity application;
    receiving, in response to providing the structured business query construct, an input query from within the business productivity application soliciting a data object;
    accessing the data object from an enterprise backend in response to the input query; and
    replacing the character sequence within the application in response to the input query by inserting the business object into the business productivity application in place of the character sequence.

20. The article of manufacture of claim 19, wherein the content to provide instructions for receiving the input query comprises content to provide instructions for receiving an item of an input query in a first state, where a user has a specific item of information to be matched.

21. The article of manufacture of claim 19, wherein the content to provide instructions for receiving the input query comprises content to provide instructions for receiving an item of an input query in a second state, where a user selects from among a list of provided options.

22. The article of manufacture of claim 19, wherein the content to provide instructions for receiving the input query comprises content to provide instructions for either receiving a first item of an input query in a first state, where a user has a specific item of information to be matched; or receiving a first item of an input query in a second state, where a user selects from among a list of provided options; and then receiving a second item of the input query in either the first or second state after receiving the first item.

23. A system comprising:

means for receiving a request to invoke a data object query from within a context of a business productivity application during runtime of the business productivity application, the request including a character sequence inputted directly into the business productivity application;

means for providing, in response to the request, a structured business query interface based on the business context, within the context of the business productivity application;

means for receiving an input query from the structured business query interface;

means for accessing a data object in response to the input query; and means for replacing the character sequence within the application in response to the input query by inserting the accessed data object into the business productivity application in place of the character sequence.

* * * * *